Patented Apr. 22, 1952

2,593,487

UNITED STATES PATENT OFFICE 2,593,487

GLUTEN HYDROLYSIS

Celestian L. Royal, Keokuk, Iowa, assignor to General Mills, Inc., a corporation of Delaware No Drawing. Application June 20, 1949,
Serial No. 100,290

4 Claims. (Cl. 260—529)

The present invention relates to the hydrolysis of wheat gluten for the production of amino acids. Wheat gluten is a mixture of proteins from wheat, and is conventionally obtained from wheat flour through a wet-separation process. Commercial wheat gluten generally contains varying amounts of starch, depending upon the thoroughness of the process of separation. A good quality gluten may contain from 2% to 5% starch, while poorer qualities may contain as high as 8% or 10% of starch.

In the hydrolysis of gluten with acid for the production of amino acids, it is well known that the carbohydrate material in the gluten undergoes reaction and results in the formation of humin or melanin, a complex mixture containing, among other substances, a condensation product of aldehydes and amino acids. This material is a precipitate of small amorphous particles, dark in color and possessing varying degrees of solubility depending on pH and other conditions. In the isolation of amino acids, it is essential to remove the melanin and decolorize the remaining solution. In the conventional process melanin is extremely difficult to filter off. It readily clogs filters and renders filtration both cumbersome and expensive. Furthermore, the decolorization of the filtrate with active carbon has been expensive and difficult. As a result, the removal of melanin has been a major problem in the amino acid industry, and has been a constant source of increased costs and loss of yield. Despite the difficulties encountered by melanin formation, little has been accomplished to eliminate or reduce the problem. Melanin formation and its removal have been accepted as a more or less necessary evil in the amino acid industry.

It has now been found that the troubles encountered with melanin formation are not due solely to the reaction products of the carbohydrates. It has been discovered that the fat contained in the original gluten has a very material effect upon this particular problem. Wheat endosperm contains fat, and part of this fat finds its way through the wet-separation process into the gluten product. Its presence in the gluten has been known but its effect upon the hydrolysis process and the isolation of amino acids has never been appreciated.

It has been found that during acid hydrolysis the fat is hydrolyzed largely to the free fatty acid state. As such it is first dispersed throughout the hydrolysate and later appears to become associated with the melanin. It has now been discovered that by carrying on a partial hydrolysis of the gluten, the fat is liberated in a form which can be conveniently separated, and that by effecting a removal of liberated fat after partial hydrolysis the problems encountered in separating the melanin formed and of decolorizing the amino acid solution can be minimized.

It is therefore an object of the present invention to provide a novel process of hydrolyzing gluten involving a removal of fat liberated after partial hydrolysis.

In carrying on the hydrolysis, the gluten is subjected to a suitable acid such as hydrochloric, of varying degrees of concentration as desired, and is subjected to the usual hydrolysis conditions for a period of time sufficient to liberate a substantial quantity of the fat. A minimum of 40–50% of the contained fat should be liberated in the preliminary hydrolysis step. From a commercial standpoint it is desired to liberate from 80–90% or even as high as 95% or more of the fat in this preliminary hydrolysis. The liberated fat is separable from the hydrolysate either by standing and decantation, or by centrifugal separation.

The amount of fat to be liberated during the partial hydrolysis is dependent to some extent upon the amount of carbohydrate and the amount of fat in the gluten employed. Thus in a gluten having a high starch content and a low fat content, it will be found that the large quantity of melanin formed will take up a large portion of the liberated fat and the melanin will still not be too difficult to filter. Under these circumstances, it will be appreciated that the quantity of fat which it is desirable to remove after partial hydrolysis need not be particularly large. On the other hand, some glutens may contain as high as 16% fat and be low in starch. Under such circumstances, it is desirable to remove as large a quantity of fat after partial hydrolysis as possible inasmuch as there will not be any substantial quantity of melanin to take up a large quantity of fat and still maintain the melanin in a reasonably filtrable condition.

Experiments have shown that the melanin formation reaction requires more drastic conditions than does the liberation of the fat. Thus where the gluten is subjected to conventional hydrolysis conditions, it is found that the fat is liberated much more rapidly than melanin is formed, and this differential can be relied on to effect a separation of sufficient fat before enough melanin has been formed to be troublesome. It has also been found that fat may be liberated at lower temperatures and at lower acid concentrations than those necessary for formation of substantial quantities of precipitated melanin. It is preferred, therefore, to carry on a preliminary hydrolysis under less drastic conditions than those employed for the final hydrolysis inasmuch as lesser quantities of melanin are formed prior to the time of fat removal.

Inasmuch as hydrolysis reduces the viscosity of the protein dispersion, it will be appreciated that the degree of hydrolysis will depend to some extent upon the method of fat separation to be employed. If the fat is to be separated by settling and decantation, it will be appreciated that the degree of hydrolysis should be slightly greater in order to reduce the viscosity of the hydrolysate. On the other hand, where centrifugal separation is employed for separating the fat, a lesser degree of hydrolysis will suffice inasmuch as the centrifugal separator multiplies the effect of gravity. As an aid in fat separation, it is possible to add a small amount of water-immiscible fat solvent such as mineral oil, which is miscible with the fat and aids in its separation.

After the liberated fat has been removed, hydrolysis is continued until it is complete. In this continued hydrolysis additional melanin is formed and residual quantities of fat are liberated. The quantity of fat liberated, however, is not sufficiently large as to cause any trouble in the melanin removal. After hydrolysis the melanin and any incidental quantity of fat may be separated from the hydrolysate by filtration or otherwise, and the filtrate subjected to the usual working-up process employed in the art, such as by crystallizing the amino acids as the hydrochloride, or by crystallizing the amino acids directly.

In the usual acid hydrolysis process apparently the fat present in the hydrolysate disperses the melanin and makes it extremely difficult to filter. By the removal of a portion of the fat, the dispersion of the melanin is minimized and accordingly it is readily filtrable. Moreover, in the usual hydrolysis process the soluble melanin has associated with it small quantities of fat which interfere with the efficiency of carbon decolorization. In the present process the quantity of fat remaining in the hydrolysate after removal of the precipitated melanin is so minute that it does not interfere with carbon decolorization and accordingly the carbon is more efficient in color removal and a smaller quantity is required.

It will be appreciated that there is a wide variety of conditions under which the hydrolysis may be conducted. Thus wide differences in acid concentration and quantity, as well as wide differences in temperatures, pressures, and the like, may be employed without any material effect upon the liberation of the fat. The essential characteristic of the process is the removal of the fat liberated after partial hydrolysis, and the completion of the hydrolysis in a defatted medium.

Example 1

The following example illustrates one method by which the process may be carried out on a laboratory scale.

Gluten (1000 g., fat content 14.3%) and hydrochloric acid (1700 g., 35%) were mixed and allowed to stand overnight at 25° C. Thereafter the mixture was heated, and a period of two hours was allowed for the temperature to rise from 25° C. to 65° C., and a further period of two hours for the temperature to rise from 65° C. to 75° C. It was then heated to 80° C. and held for one and one-half hours. During the last three and one-half hours of hydrolysis the mixture was agitated. At the end of hydrolysis the agitation was discontinued and the hydrolysate allowed to stand for three hours at temperatures of 65-75° C., permitting the fat fraction to rise. The fat was then separated (volume 275 ml.) to leave a fat-free hydrolysate (2025 ml.).

200 ml. of 35% HCl were added to the fat suspension and the mixture agitated. It was then permitted to stand at 50° C. overnight, after which the fat-free extract was withdrawn and added to the fat-free hydrolysate. As an alternative, the quantity of HCl employed for this washing may be reduced to 100 ml. or less, followed by aqueous washing of 75 ml. of water or less. Further washing may be employed if desired.

The acid-washed fat suspension weighed 212 g. and contained only 1.2% of the total nitrogen of the original wheat gluten.

The fat suspension was then centrifuged to yield the following three layers: upper layer—120 ml. of fat; middle layer—68 g. of melanin-fat mixture; and lower layer—34 g. of acid solution. The melanin-fat mixture was found to contain 8 g. of fat-free dry melanin.

The following table will illustrate the wide variety of hydrolysis conditions which may be employed with varying results. In these experiments one part of gluten (13.9% fat) was reacted with 1.7 parts of 34% HCl. The quantity of fat reported is that which separated at the top of the centrifuge tube in which 280 g. of hydrolysate was centrifuged for 15 minutes at 1500 R. P. M.

| Sample | Treatment | Fat removed |
|---|---|---|
| | | ml. |
| 1 | 24 hours at 25° C., followed by raising the temperature to 80° C., and then cooling to 35° C. | 4 |
| 2 | 24 hours at 25° C., after which the temperature was raised to 80° C., held for 1½ hours and cooled. | 6 |
| 3 | heated to 80° C. in 26 min., brought to boiling in 5 min., refluxed for 15 min., cooled. | 6 |
| 4 | heated to 80° C. in 26 min., brought to boiling in 5 min., refluxed for 30 min., cooled. | 6.4 |
| 5 | heated to 80° C. in 26 min., brought to boiling in 5 min., refluxed for 45 min., cooled. | 6.3 |
| 6 | heated to 80° C. in 26 min., brought to boiling in 5 min., refluxed for 1 hr., cooled. | 2.7 |
| 7 | heated to 80° C. in 26 min., brought to boiling in 5 min., refluxed for 4 hrs., cooled. | 3 |
| 8 | 24 hours at 25° C., after which temperature was raised to 95° C. in 5 min., refluxed 15 min., cooled. | 7.0 |

It will be apparent from this table that in samples 6 and 7 the extent of hydrolysis was carried beyond an optimum and that part of the fat either became dispersed or became associated with the melanin and was not separated.

Example 2

Three hundred pounds of wheat gluten (3.6% moisture, 79.6% protein, 11.0% fat) was fed into a 100 gallon hydrolyzer containing 510 pounds of a 22° Baumé hydrochloric acid. The gluten was fed in over a one-hour period. During this time steam was fed to the jacket of the hydrolyzer at such a rate that at the end of the one hour the temperature of the mixture was 140° F. With continuous agitation on the mixture steam was fed to the jacket at such a rate that the temperature of the mixture rose to 160° F. over a period of three hours. At the end of this three-hour period, the agitation was stopped and the temperature of the mixture was maintained at 160° F. The mixture was then allowed to stand for three and one-half hours to effect separation. Thereafter, the aqueous phase was removed from the bottom of the hydrolyzer, leaving the oil phase in the hydrolyzer. To the oil phase (9 gallons) was added an equal volume of 22° Baumé hydrochloric acid. The mixture was agitated briefly and then allowed to stand for one hour. The aqueous phase was drawn off the bottom of the hydrolyzer to leave an oil phase having a volume of 7 gallons, and analyzing 49.1% fat by weight. The oil phase contained considerable quantities of humin. The percent of fat recovered in the oil phase was 89.5% of theoretical. The two aqueous phases were combined and hydrolyzed in the normal manner.

*Example 3*

3400 pounds of 22° Baumé hydrochloric acid was fed into a 750 gallon jacketed, glass-lined hydrolyzer. The temperature of the hydrochloric acid was raised to 110° F. over a period of one and one-half hours by means of water circulating through the jacket under controlled temperature of 130° F. Agitation was then started and 2000 pounds of wheat gluten (5% moisture, 78% protein, 10% fat) was fed into the hydrolyzer in a steady stream over a period of one hour. The temperature of the circulating water was then raised to approximately 165° F. and agitation was continued, to raise the temperature of the gluten-acid mixture to 160° F. in approximately one hour. The temperature was then maintained at 160° F. and agitation was continued for an additional three hours to effect partial hydrolysis of the gluten. Thereafter agitation was stopped and the hydrolysate was allowed to stand for an additional four hours at 160° F. The aqueous phase was then decanted from the bottom of the hydrolyzer, leaving an oil phase equal to approximately 10% of the total hydrolysate. The aqueous phase was then hydrolyzed in the usual manner. The oil phase constituted approximately 85-95% of the theoretical quantity. This oil phase may be washed with acid and the acid washing combined with the hydrolysate in the manner of Example 2.

I claim as my invention:

1. Process of hydrolyzing fat-containing gluten for the recovery of an amino acid compound, which comprises subjecting gluten to partial acid hydrolysis to liberate a substantial quantity of the contained fat, separating the liberated fat by gravity, completing the hydrolysis, and recovering an amino acid compound.

2. Process of hydrolyzing fat-containing gluten for the recovery of an amino acid compound, which comprises subjecting gluten to partial acid hydrolysis to liberate at least about 40% of the contained fat, separating the liberated fat by gravity, subjecting the gluten to further hydrolysis, and recovering an amino acid compound.

3. Process of hydrolyzing fat-containing gluten for the recovery of an amino acid compound, which comprises subjecting gluten to partial acid hydrolysis to liberate at least about 80% of the contained fat, separating the liberated fat by gravity, subjecting the gluten to further hydrolysis, and recovering an amino acid compound.

4. Process of hydrolyzing fat-containing gluten for the recovery of an amino acid compound, which comprises subjecting gluten to partial acid hydrolysis to liberate at least about 80% of the contained fat, subjecting the hydrolysate to centrifugal separation for the removal of the liberated fat, continuing the hydrolysis to substantial completion, removing the melanin and the remainder of the fat from the hydrolysate, and recovering an amino acid compound from the hydrolysate.

CELESTIAN L. ROYAL.

REFERENCES CITED

The following references are of record in the file of this patent:

UNITED STATES PATENTS

| Number | Name | Date |
|---|---|---|
| 2,176,785 | Braun | Oct. 17, 1939 |
| 2,470,955 | Sahyun | May 24, 1949 |

OTHER REFERENCES

Bancroft et al., "J. of Physical Chem.," vol. 41, pp. 1163–1170 (1937).

Gordon et al., Biochem. J., vol. 35, pp. 1369–1387 (1941).

Block, "Advances in Protein Chemistry," edited by Anson et al., (Academic Press), vol. II, p. 122 (1945).